United States Patent
Izumisawa

(10) Patent No.: US 7,669,210 B2
(45) Date of Patent: Feb. 23, 2010

(54) OPTICAL PICKUP DEVICE AND OPTICAL DISK DEVICE USING THE SAME

(75) Inventor: Masaomi Izumisawa, Yokohama (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 555 days.

(21) Appl. No.: 11/533,214

(22) Filed: Sep. 19, 2006

(65) Prior Publication Data

US 2007/0074237 A1 Mar. 29, 2007

(30) Foreign Application Priority Data

Sep. 29, 2005 (JP) ............................. 2005-285233

(51) Int. Cl.
*G11B 7/08* (2006.01)

(52) U.S. Cl. ..................................................... 720/675

(58) Field of Classification Search .......... 720/674–679
See application file for complete search history.

(56) References Cited

U.S. PATENT DOCUMENTS

| 6,347,069 | B1 * | 2/2002 | Wakikawa et al. .......... 720/672 |
| 6,597,652 | B2 * | 7/2003 | Obara ........................ 720/675 |
| 7,525,899 | B2 * | 4/2009 | Ryu ............................ 369/223 |
| 7,552,454 | B2 * | 6/2009 | Yeh et al. ..................... 720/675 |
| 2005/0289579 | A1 * | 12/2005 | Ohsuga ....................... 720/675 |

FOREIGN PATENT DOCUMENTS

| CN | 1551204 A | 12/2004 |
| JP | 2001-256739 | 9/2001 |
| JP | 2004-022054 | 1/2004 |
| JP | 2004-348794 | 12/2004 |
| JP | 2004-348823 | 12/2004 |
| JP | 2005-122859 | 5/2005 |

OTHER PUBLICATIONS

JP patent document to Ishizuka (2001-256739) published Sep. 21, 2001—English machine translation only.*
JP patent document to Ono (2004-022054) published Jan. 22, 2004—English machine translation only.*

* cited by examiner

*Primary Examiner*—Brian E Miller
(74) *Attorney, Agent, or Firm*—Oblon, Spivak, McClelland, Maier & Neustadt, L.L.P.

(57) ABSTRACT

A guide portion provided in parallel with a main shaft is formed integrally with a resin-made mechanism chassis. A slidable member is provided between a guide receiver portion of a pickup and the guide portion. The guide receiver portion is provided with a spring member which applies an energizing force to press the slidable member and the guide portion.

2 Claims, 3 Drawing Sheets

OPTICAL PICKUP DEVICE AND OPTICAL DISK DEVICE USING THE SAME

CROSS REFERENCES TO RELATED APPLICATIONS

The present invention is based upon and claims the benefit of priority from the prior Japanese Patent Application No. 2005-285233, filed on Sep. 29, 2005; the entire contents of which are incorporated herein by reference.

BACKGROUND OF THE INVENTION

1. Field of the Invention

The present invention relates to an optical pickup device, and particularly to an optical pickup device characterized by an optical pickup movement mechanism, and an optical disk device using the same.

2. Description of the Related Art

A movement mechanism for an optical pickup in a conventional optical disk device adopts a structure in which two guide shafts are provided in parallel to move the pickup, and the optical pickup is moved supported by the guide shafts.

For example, FIG. 5 shows a structure of a conventional optical pickup device. In the conventional optical pickup device 50, a main shaft 52 and a subsidiary shaft 53 which are metal drive shafts are provided as guide shafts respectively on two sides of a traverse mechanism chassis 51. Bearings 54a and 54b of a pickup base 54 on which an optical pickup 56 is mounted slide on the main shaft 52 and subsidiary shaft 53 as the guide shafts, kept in tight contact with these shafts by the deadweight of the optical pickup 56 or by a pressing spring force. In this case, a lubricant metal is incorporated in the bearing 54a on the side of the main shaft 52. On the other side, the bearing 54b on the side of the subsidiary shaft 53 has a structure in which the bearing 54b is directly formed in the pickup base 54. The pickup base 54 is molded mostly as a metal cast product.

An alternative known structure of the conventional optical pickup device is constituted by one metal guide shaft and a guide integrated with a resin-made traverse mechanism chassis provided in parallel with the guide shaft (e.g., an optical disk device SD-C2002 manufactured by TOSHIBA Corporation).

As described above, a metal shaft is used as the main shaft as a drive shaft among guide shafts. However, as the subsidiary shaft, a metal shaft is used in some cases or a guide integrated with a mechanism chassis is used in other cases.

As a countermeasure to prevent abrasion caused by slidable contact between a metal subsidiary shaft and a metal bearing, a resin material interposed between the subsidiary shaft and the bearing has been proposed (for example, see Jpn. Pat. Appln. Laid-Open Publications No. 2001-256739 and No. 2004-348794.

Conventional optical pickup devices have a mechanism in which an optical pickup is attached to metal guide shafts by a bearing provided in the optical pickup, to allow the optical pickup to slide on a guide shaft. Since the height accuracy and strength are necessary for the bearing, the bearing portion of the pickup is made of metal in many cases.

In addition, the bearing portion of the optical pickup on the side of the subsidiary shaft and a guide shaft are continuously in tight contact with each other. Hence, use of a metal guide shaft having high processing accuracy is necessary to prevent abrasion. As an alternative, use of a material having excellent slidability is needed in case of a guide portion integrated with a resin-made mechanism chassis. The former case of using a metal guide shaft involves problems such as an increased weight, necessity to polish surfaces of the shaft, and the like. The latter case of a guide portion integrated with a resin-made mechanism chassis involves a problem that strength of the mechanism chassis lowers.

BRIEF SUMMARY OF THE INVENTION

It is an object of the present invention to provide an optical pickup device which has a guide portion integrated with a resin-made mechanism chassis using a material having high rigidity, with a slidable member further provided at a guide receiver portion of an optical pickup.

In an aspect of the present invention, an optical pickup device includes: a base provided with a bearing portion and a guide receiver portion respectively on two sides of the base, with an optical pickup mounted therebetween on the base, the optical pickup being to irradiate an optical disk with a light beam to read or write data; a guide unit constituted by a drive shaft which the bearing portion of the base contacts tightly, and a guide portion integrated with a mechanical chassis to which the guide receiver portion of the base is attached, to guide the base so as to move linearly; and a slidable member provided between the guide receiver portion of the base and the guide portion.

DETAILED DESCRIPTION OF THE INVENTION

An embodiment of an optical pickup device according to the present invention will now be described with reference to the drawings.

Figure 1:
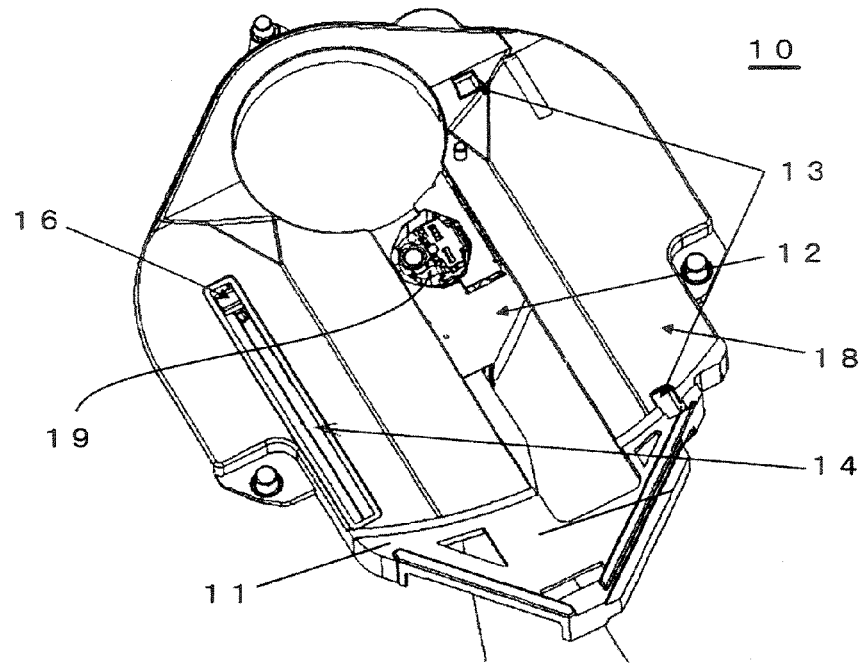
FIG. 1 is a perspective view from above of an optical pickup mechanism according to an embodiment of the present invention.
Figure 2:
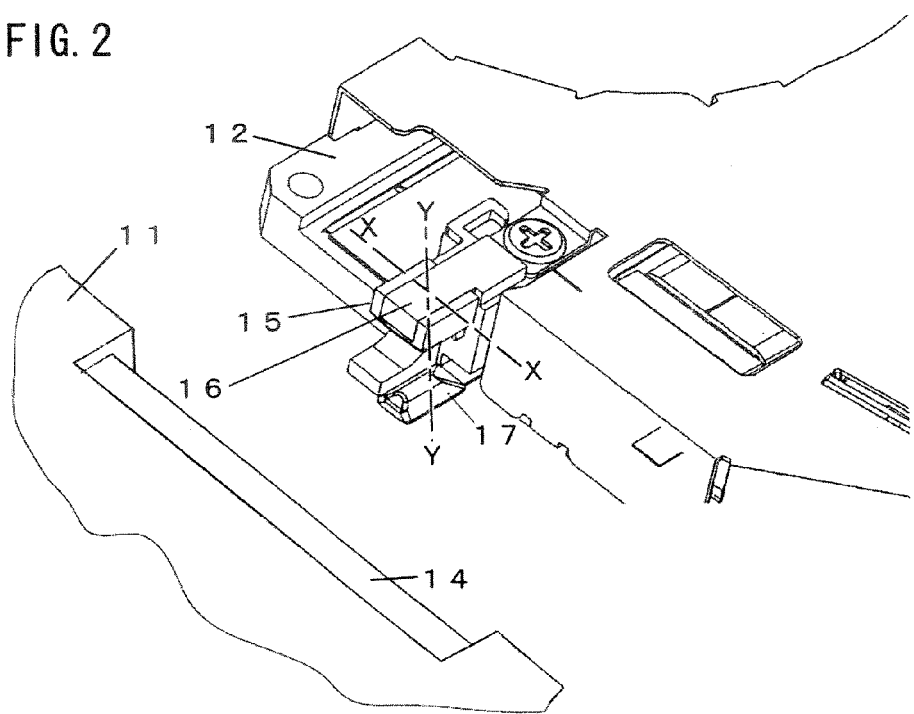
FIG. 2 is a perspective view from above of a part of the optical pickup mechanism according to the embodiment of the present invention.
Figure 3:
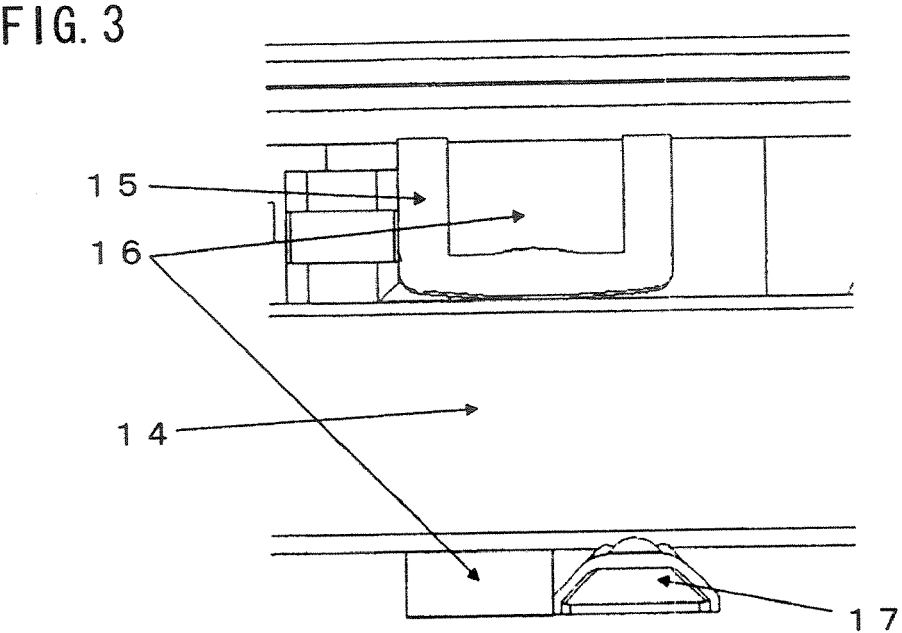
FIG. 3 is an X-X cross-sectional view of a main part of the optical pickup mechanism shown in FIG. 2.
Figure 4:
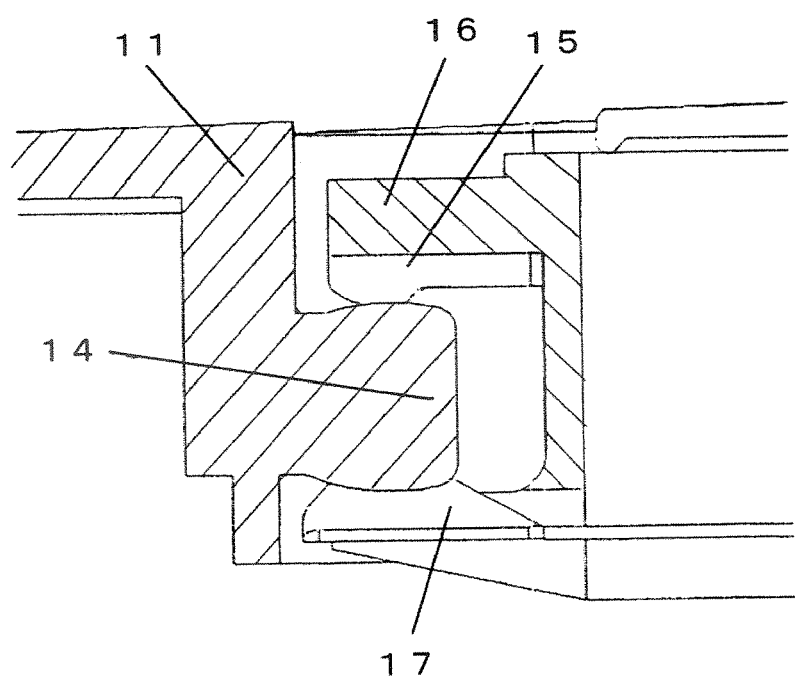
FIG. 4 is a Y-Y cross-sectional view of the main part of the optical pickup mechanism shown in FIG. 2.
Figure 5:
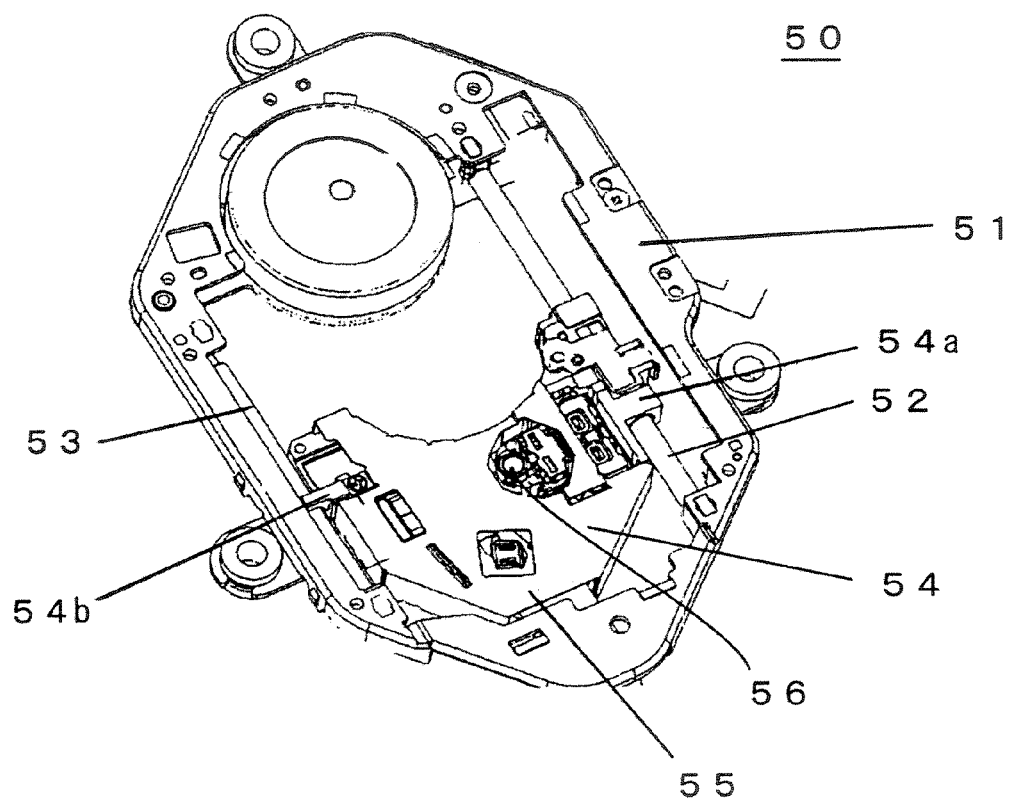
FIG. 5 is a perspective view from above of an optical pickup mechanism of a conventional optical disk device.

FIG. 1 is a perspective view from above of an optical pickup mechanism. FIG. 2 is another perspective view from above of a main part of the optical pickup mechanism. FIG. 3 is an X-X cross-sectional view of the main part of the optical pickup mechanism shown in FIG. 2. FIG. 4 is a Y-Y cross-sectional view of the main part of the optical pickup mechanism shown in FIG. 2. In the drawings, the same portions are denoted by the same reference symbols respectively, and reiterative description will be omitted.

As shown in FIG. 1, an optical pickup device 10 has a traverse mechanism chassis 11 on which a main shaft 13 as a drive shaft and a guide portion (a subsidiary shaft integrated with the chassis) 14 are provided. A base 12 is pickup base mounting an optical pickup 19 that irradiates an optical disk with light to read or write data. A guide receiver portion 16 and a bearing portion are provided on both sides of the base 12. The optical pickup 19 is provided between the guide receiver portion 16 and the bearing portion. The guide receiver portion 16 of the base 12 and the bearing portion on the side of the main shaft 13 slide kept in tight contact with the main shaft 13 and the guide portion 14 by the dead weight of the optical pickup 19 or by a pressing spring force. The optical pickup 19 is supported via the base 12 by two guides which are the main shaft 13 and the guide portion 14. A lubricant metal is built in the bearing (not shown) on the side of the main shaft 13. On the other side, the guide receiver portion 16 on the side of the guide portion 14 has a structure in which a bearing portion is directly formed in the base 12. The base 12 is molded mainly by a metal.

As shown in FIG. 1, the optical pickup device 10 according to the embodiment is basically constituted by the base 12, the main shaft 13 as a guide unit, a guide portion 14, and the traverse mechanism chassis 11.

The base 12 is provided with the guide receiver portion 16, and the optical pickup 19 which irradiates an optical disk with a light beam to read or write data is attached thereto. The drive shaft is constituted by the main shaft 13 and the guide portion 14 and serves to guide the base 12 so as to move linearly. That is, the base 12 is moved in radial directions of an optical disk via the guide portion 14 of the mechanism chassis 11 and the main shaft 13. The base 12 is preferably driven by a stepping motor (not shown) which is controllable with high accuracy.

For example, a stainless steel rod whose surface is polished is preferably used as the main shaft 13 as the drive shaft.

A mechanism cover 18 covers an upper face of the mechanism chassis 11 of the optical pickup mechanism. This mechanism cover 18 exposes parts of the main shaft 13 and the base 12, the guide portion 14, and the guide receiver portion 16.

Next, a structure of the guide receiver portion 16 attached to the guide portion 14 will be described.

As shown in FIGS. 2 to 4, the guide portion 14 is formed like a rail integral with the mechanism chassis 11 made of resin. Further, a slidable member 15 made of resins is attached to, e.g., engaged in an upper portion of the guide receiver portion 16 which has a cross-sectional shape like a square bracket (see FIG. 4). This slidable member 15 is provided between the guide receiver portion 16 and the guide portion 14.

The mechanism chassis 11 is preferably manufactured to achieve high rigidity with suppressed anisotropy of mold shrinkage factor. To achieve this characteristic ensures a characteristic of low warping. Concerning rigidity of the mechanism chassis 11, for example, bending strength is preferably 220 MPa or higher, a bend elastic constant is preferably 20,000 MPa or higher, and distortion at the bending strength is preferably 1.7% or lower. These mechanical physical properties can be based on measurement methods defined in ISO 178, for example.

Concerning the anisotropy of mold shrinkage factor of the mechanism chassis 11, for example, a difference in the mold shrinkage factor between a right-angle direction and a flowing direction is preferably 0.02% or lower. A method of measuring the mold shrinkage factor can be a well-known method using an injection pressure as a parameter, and the explanation thereof will be omitted here.

Alternatively, the mechanism chassis 11 may be made of a liquid crystal polymer, for example.

The slidable member 15 needs to have excellent abrasion resistance in addition to slidability. Hence, the slidable member 15 is preferably be made of a polyacetal resin.

As shown in FIGS. 3 and 4, a spring member 17 is attached to a lower part step portion of the guide receiver portion 16 which has a cross-sectional shape like a square bracket. This spring member 17 generates an energizing force to press the slidable member 15 and the guide portion 14. Therefore, the spring member 17 has an upwardly convex shape to be elastically deformable. The spring member 17 may have any shape as long as the shape is elastically deformable. The spring member 17 may be made of a metal material or another material. In case of a resin material, for example, the spring member 17 is made of a polyacetal resin. A pressing force of the spring member 17 suppresses rattling between the guide receiver portion 16 and the guide portion 14.

Further, weight saving can be achieved since the optical pickup 19 described above is mounted on the optical disk device 10.

As described above, in the present embodiment, the guide portion 14 is of a type integrated with the mechanism chassis, using resin with high rigidity. Further, the resin-made slidable member 15 is attached to the guide receiver portion 16 of the optical pickup 19. Therefore, weight can be saved in the traverse mechanism. The guide portion 14 of the mechanism chassis and the guide receiver portion 16 of the pickup can realize high slidability and abrasion resistance.

The present invention is not limited to the embodiment just as what has been described. Constituent elements of the invention may be modified in practical stages of realizing the invention without deviating from the scope of the invention. Further, various inventions can be derived from appropriate combinations of plural ones of the constituent elements disclosed in the above embodiment. For example, several constituent elements may be removed from all the constituent elements disclosed in the above embodiment. Furthermore, constituent elements of different embodiments may be appropriately combined.

What is claimed is:

1. An optical pickup device, comprising:
    a drive shaft that moves an optical device for reading data from or writing data in an optical disk in a radial direction of the optical disk;
    a mechanical chassis made of resin that includes the drive shaft disposed thereon and a guide portion formed integrally therewith, the guide portion being parallel with the drive shaft;
    a metal base that is slid in the radial direction in a manner closely in contact with the drive shaft, and a guide receiver portion having a U-shaped cross section that is slid in the radial direction in a manner closely in contact with the guide portion formed on the mechanical chassis, the optical device being mounted thereon;
    a slidable member made of resin that is provided between the guide portion of the mechanical chassis and the guide receiver portion of the base; and
    a spring member that is provided between the guide portion of the mechanical chassis and the guide receiver portion on an opposite side of the slidable member, and applies an energizing force to press the slidable member and the guide portion.

2. The optical pickup device according to claim 1, wherein the mechanical chassis is made of the resin, which has a bending strength of 220 MPa or higher, a bend elastic factor of 20,000 MPa or higher, a distortion of 1.7% or lower at the bending strength, and an anisotropy of a mold shrinkage factor of 0.02% or lower.

* * * * *